(12) United States Patent
Chiang (10) Patent No.: US 9,566,738 B2
(45) Date of Patent: Feb. 14, 2017

(54) METHOD FOR MANUFACTURING A HANDHELD PRIMING PUMP

(71) Applicant: GEE-CHANG NYLON PLASTIC CO., LTD., Changhua (TW)

(72) Inventor: K. C. Chiang, Changhua (TW)

(73) Assignee: GEE-CHANG NYLON PLASTIC CO., LTD., Changhua (TW)

( * ) Notice: Subject to any disclaimer, the term of this patent is extended or adjusted under 35 U.S.C. 154(b) by 266 days.

(21) Appl. No.: 14/541,155

(22) Filed: Nov. 14, 2014

(65) Prior Publication Data

US 2016/0136863 A1    May 19, 2016

(51) Int. Cl.
*B29C 49/06* (2006.01)
*F02M 37/16* (2006.01)
*F02B 61/04* (2006.01)
*B29C 49/42* (2006.01)
*B29K 105/00* (2006.01)
*B29L 22/00* (2006.01)

(52) U.S. Cl.
CPC ......... *B29C 49/064* (2013.01); *B29C 49/4252* (2013.01); *F02B 61/045* (2013.01); *F02M 37/16* (2013.01); *B29K 2105/258* (2013.01); *B29L 2022/00* (2013.01)

(58) Field of Classification Search
None
See application file for complete search history.

*Primary Examiner* — Monica Huson
(74) *Attorney, Agent, or Firm* — Yuwen Guo (57) ABSTRACT

A method for manufacturing a handheld priming pump is disclosed. It is capable of being automatic production and increase production yield after being modularized. The production time may be shortened and the defect rate may be also reduced.

3 Claims, 16 Drawing Sheets

METHOD FOR MANUFACTURING A HANDHELD PRIMING PUMP

FIELD OF THE INVENTION

The present invention relates to a priming pump, and more particularly to a method for manufacturing a handheld priming pump.

BACKGROUND OF THE INVENTION

An engine, such as a marine engine, may employ a rubber primer bulb type pumping device to provide initial prime to the fuel supply system. Such devices are simple rubber bulbs connected to fuel hoses and with a set of one-way valves to direct the direction of pumping when the bulb is squeezed.

The used primer bulb type pumping device may be disclosed in U.S. Pat. No. 8,834,137. A pump is disclosed and includes a substantially tubular housing having an inlet end and an outlet end and defining a central axis and a chamber within the body portion, and a movable valve assembly slidably received within the housing for movement in the direction of the central axis. The pump also includes a handle assembly slidably disposed at least partially around an outer circumference of the housing for movement in the direction of the central axis, the handle assembly being substantially annular ring-shaped, and the handle assembly including a grip engageable by a hand of an operator for manually sliding the handle assembly, the handle assembly being coupled to the movable valve assembly, manual movement of the handle assembly along the central axis causing corresponding movement on the movable valve assembly along the central axis.

However, the structure of the conventional primer bulb type pumping device is complicated and then make the manufacturing method is multi-stage and wasting time. Further, the production yield may be limited.

SUMMARY OF THE INVENTION

An objective of this invention is providing a method for manufacturing a handheld priming pump. It is capable of being automatic production and increase production yield after being modularized. The production time may be shortened and the defect rate may be also reduced.

To achieve above objectives, a method for manufacturing a handheld priming pump is provided. The steps of the method may comprise:

step S1: injecting a plastic resin into a mold by an injector, the mold includes a first half mold and a second half mold which are combined with each other, and a chamber is defined in the mold when the first half mold and second half mold are closed;

step S2: returning the injector to a standby position while the chamber is injected full of the plastic resin, and a residue of the plastic resin is cut away the injector by a blade disposed adjacent to the injector;

step S3: shifting the mold under a nozzle spaced from the injector;

step S4: moving the nozzle to a top of the chamber of the mold and blowing such that the plastic resin in the chamber is then formed a first priming pump semi-finished product;

step S5: returning the nozzle to an original position, and shifting the mold to a rail after cooling the mold, the rail is spaced from the nozzle and disposed at one side opposite to the nozzle;

step S6: opening the mold after the mold moving to the rail such that the first half mold and the second half mold are separated each other and then continue shifting to the rail until an upper portion of the first priming pump semi-finished product is clipped by the rail;

step S7: combining with the first half mold and the second half mold and at the same time driving a first knife and second knife to cut the upper portion of the first priming pump semi-finished product to form a second priming pump semi-finished product; and step S8: dropping the second priming pump semi-finished product into a box to collect after the upper portion of the first priming pump semi-finished product is cut.

The above-mentioned method may further comprise a step S9, which is cutting a lower portion of the second priming pump semi-finished product to form a priming pump finished product.

In another embodiment, the mold, the first knife, the second knife, the nozzle, the rail, and the box are a forming module, there are two forming modules respectively arranged at two sides of the injector and move synchronously.

Further features and advantages of the present invention will become apparent to those of skill in the art in view of the detailed description of preferred embodiments which follows, when considered together with the attached drawings and claims.

BRIEF DESCRIPTION OF THE DRAWINGS

All the objects, advantages, and novel features of the invention will become more apparent from the following detailed descriptions when taken in conjunction with the accompanying drawings.

DESCRIPTION OF THE PREFERRED EMBODIMENT

Referring now to the drawings where like characteristics and features among the various figures are denoted by like reference characters.

Figure 1:
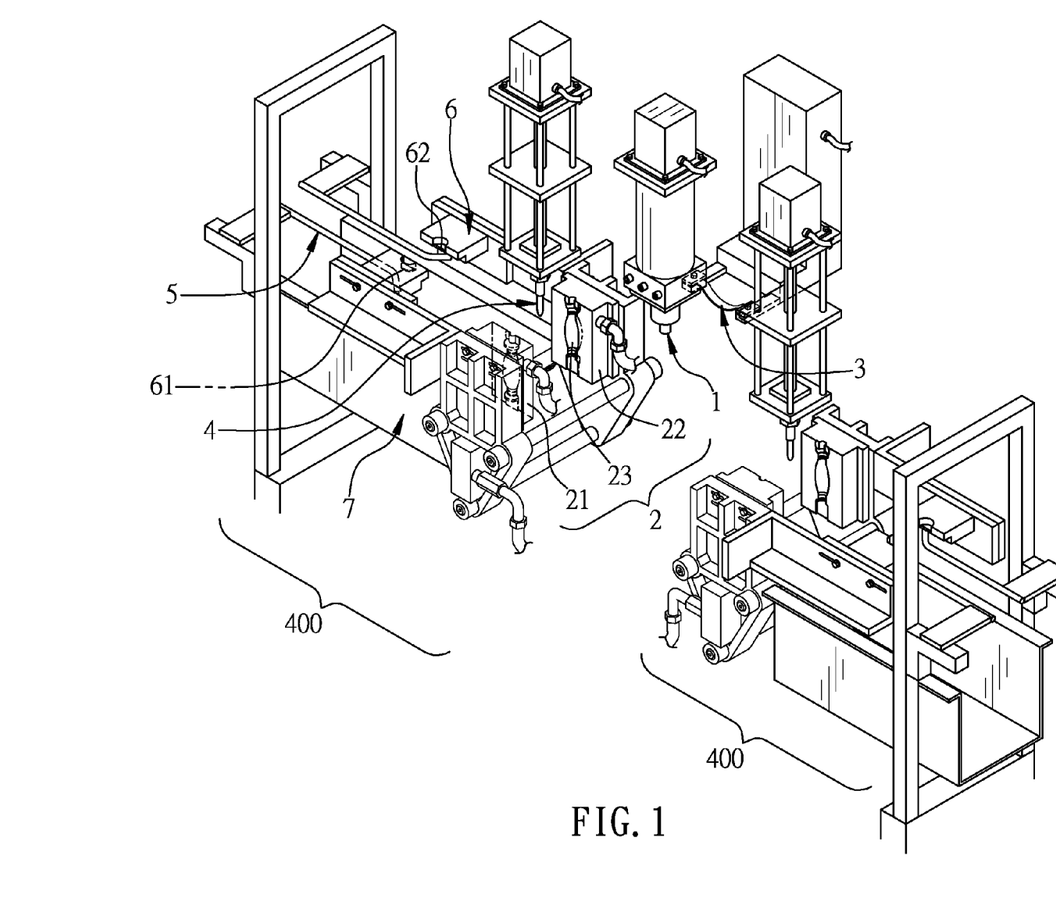
FIGS. 1 to 8 are operation drawing of a method for manufacturing a handheld priming pump according to this present invention.
Figure 2:
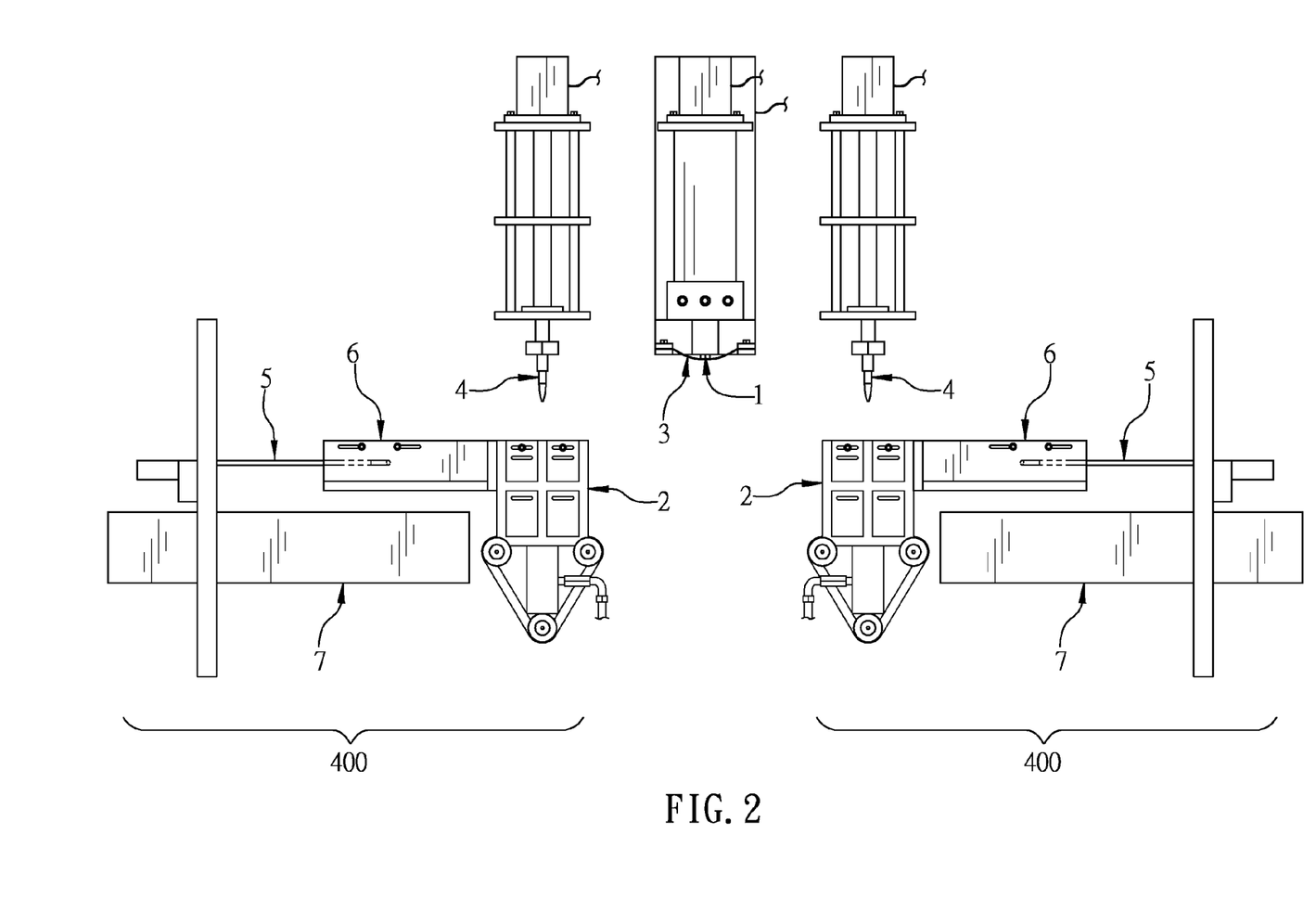
Figure 3:
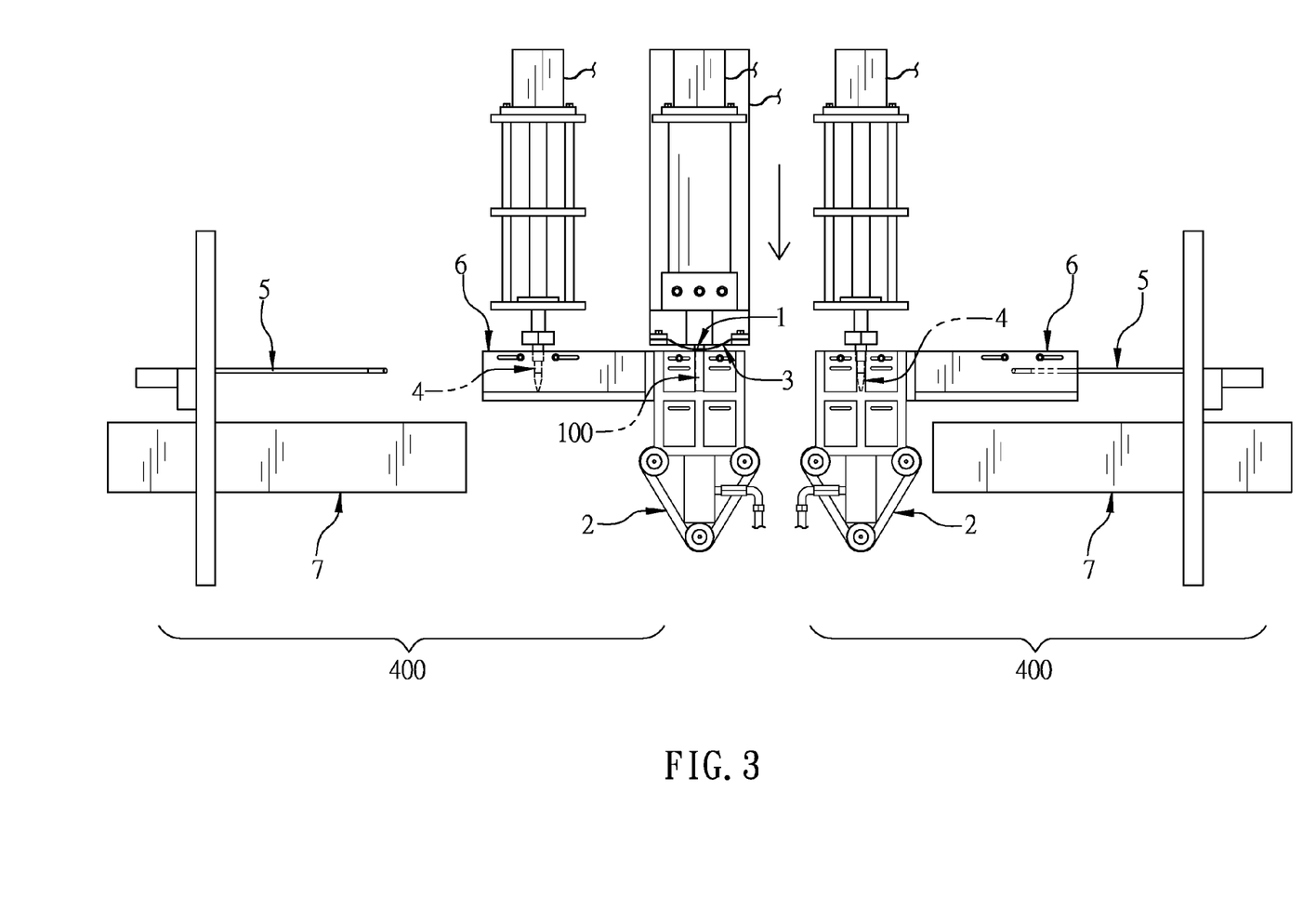
Figure 4:
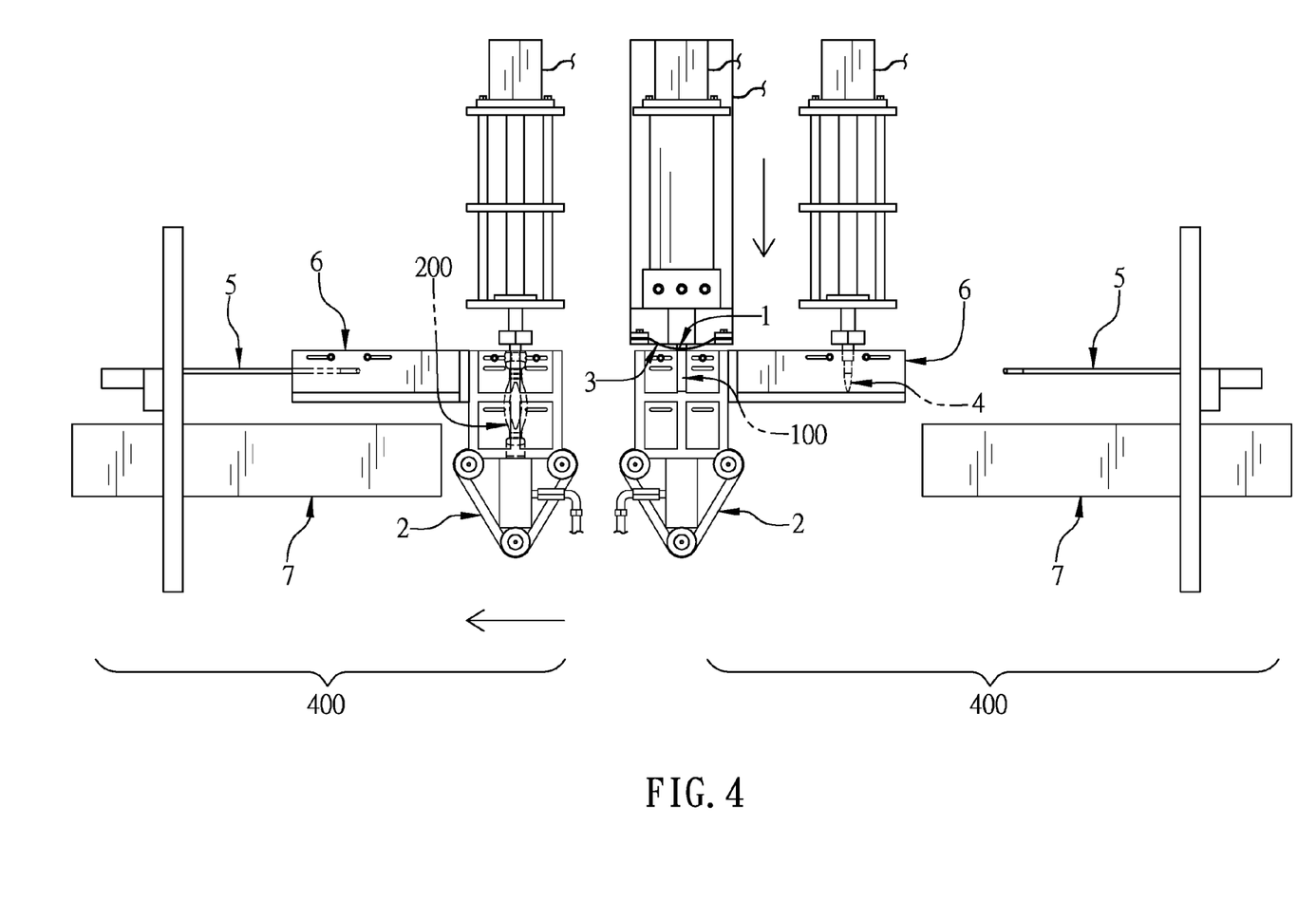
Figure 5:
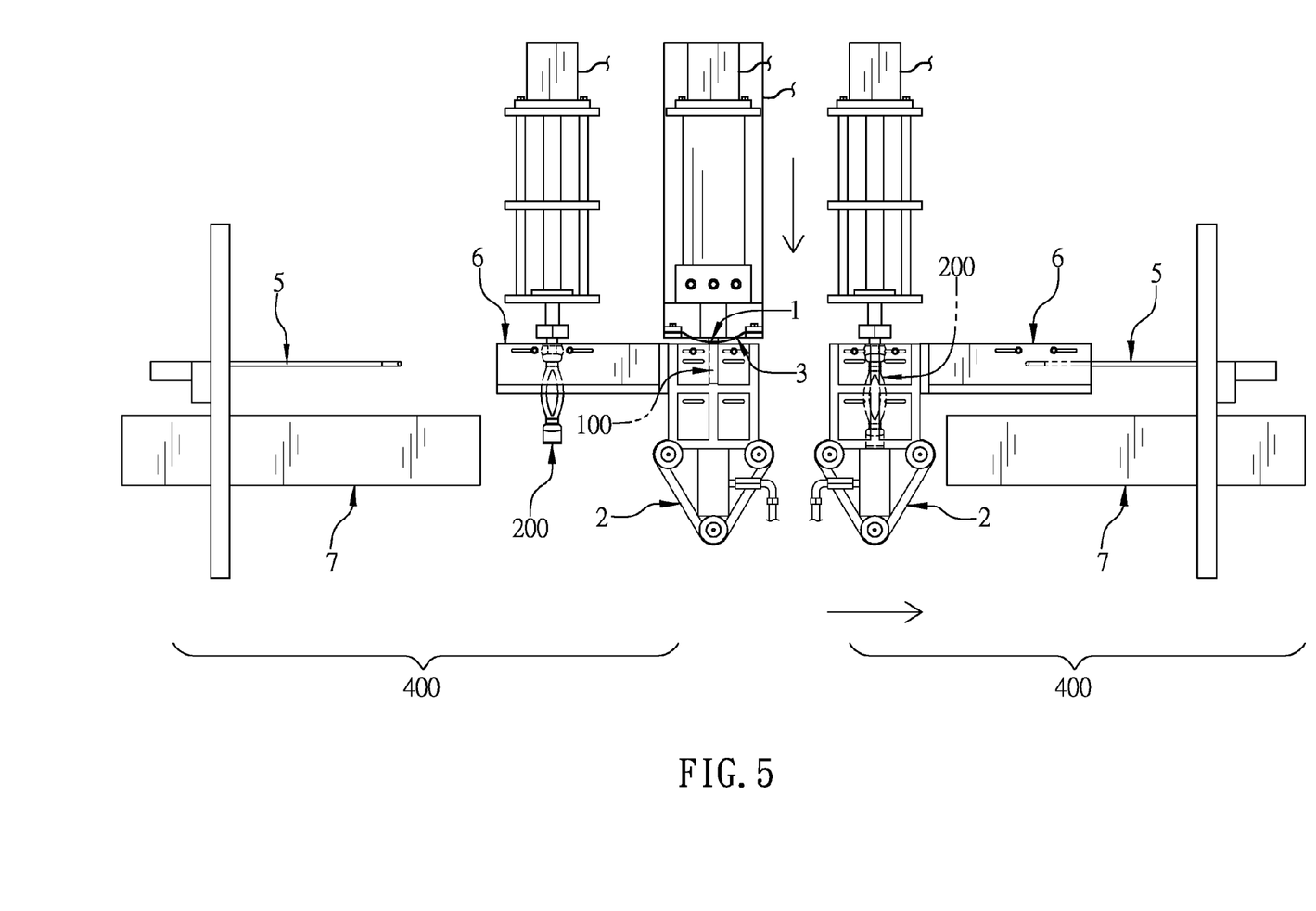
Figure 6:
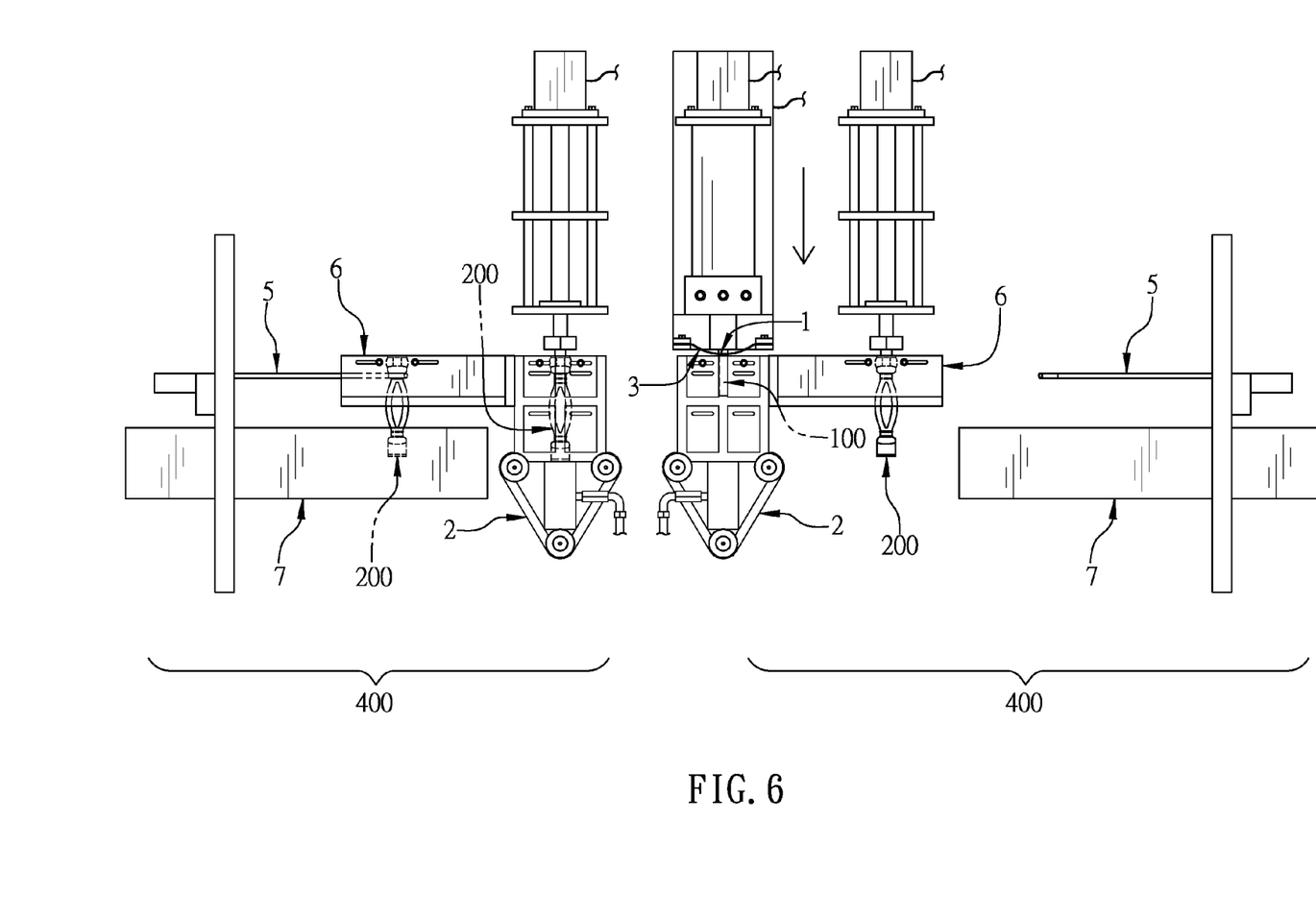
Figure 7:
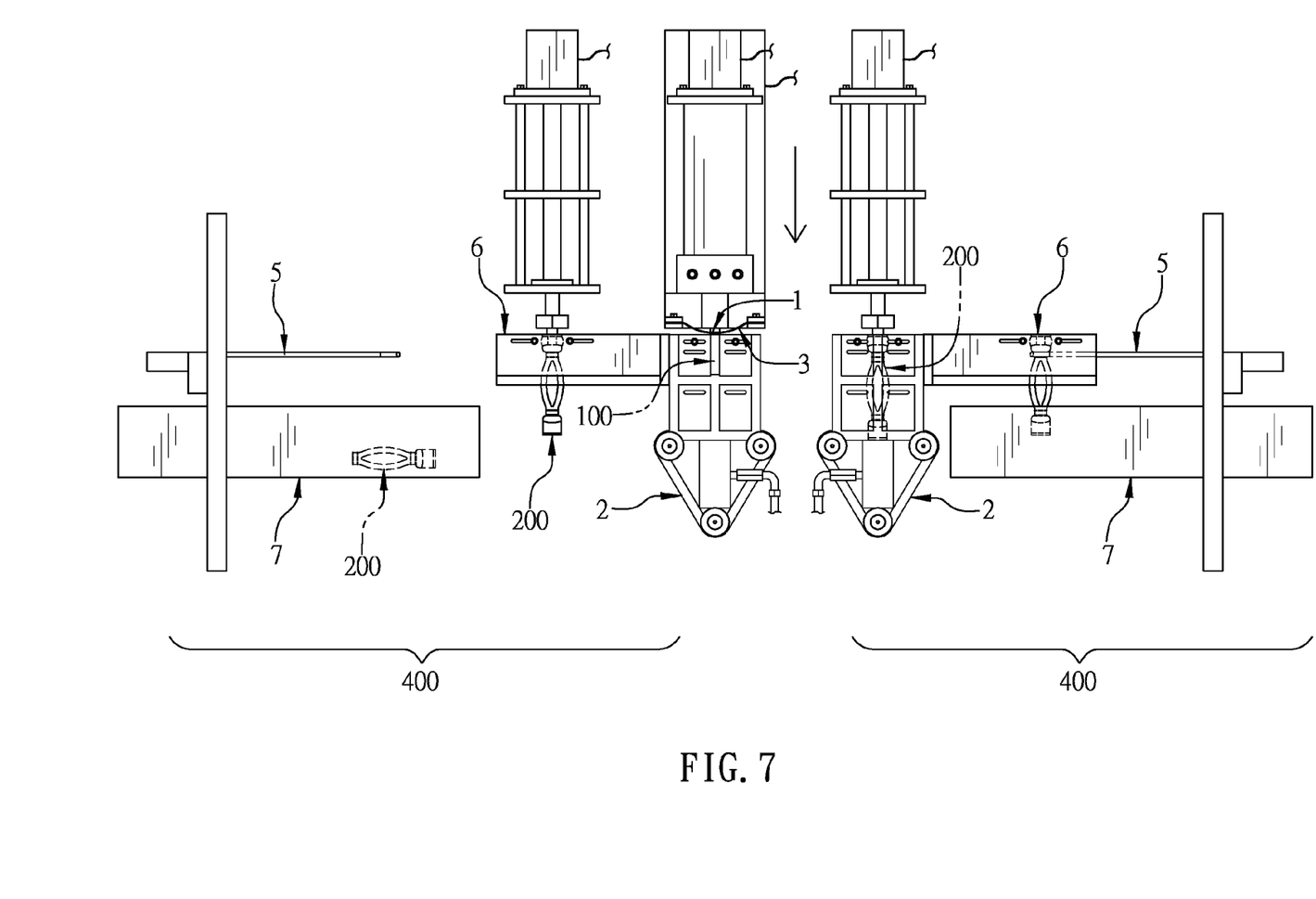
Figure 8:
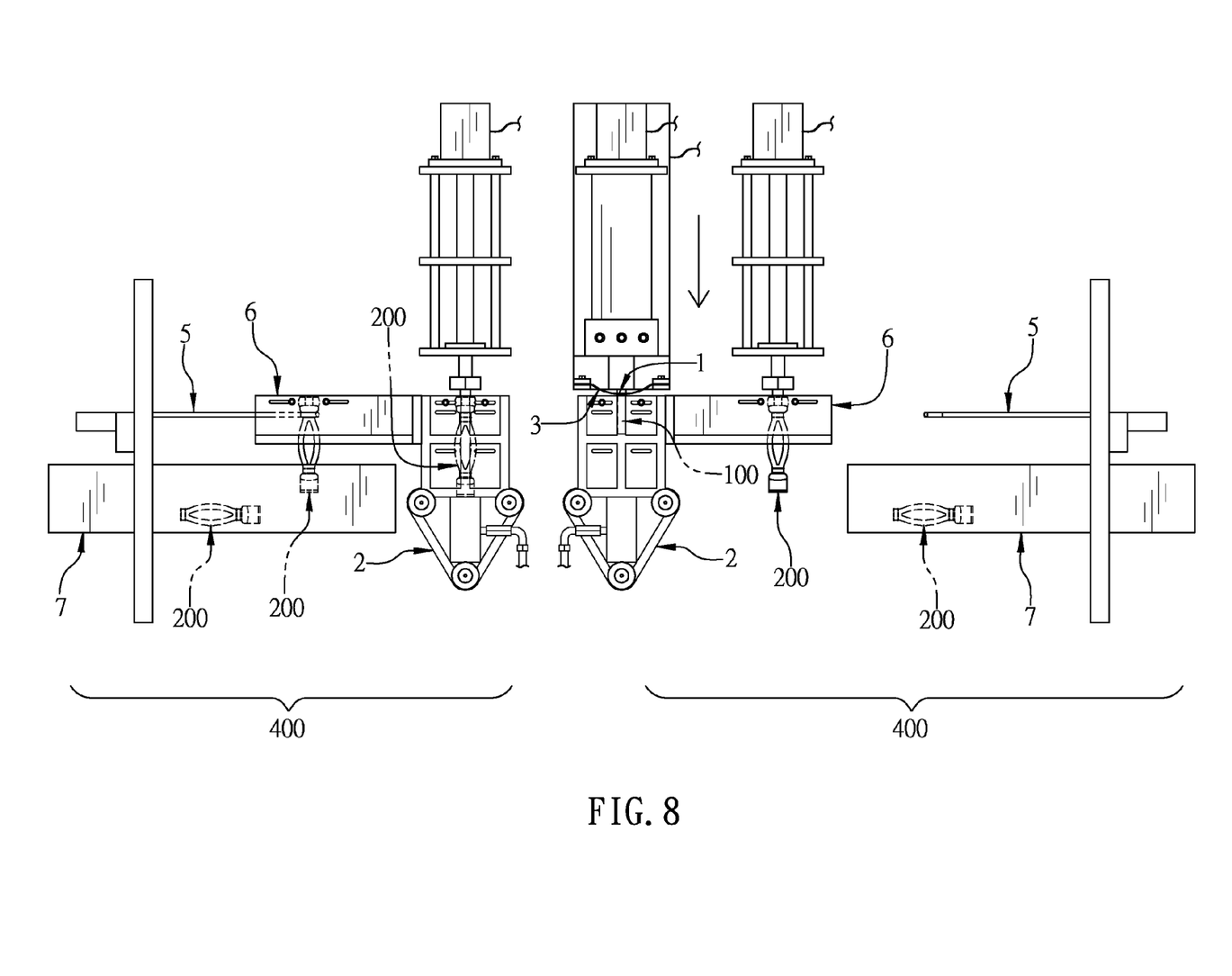
Figure 9:
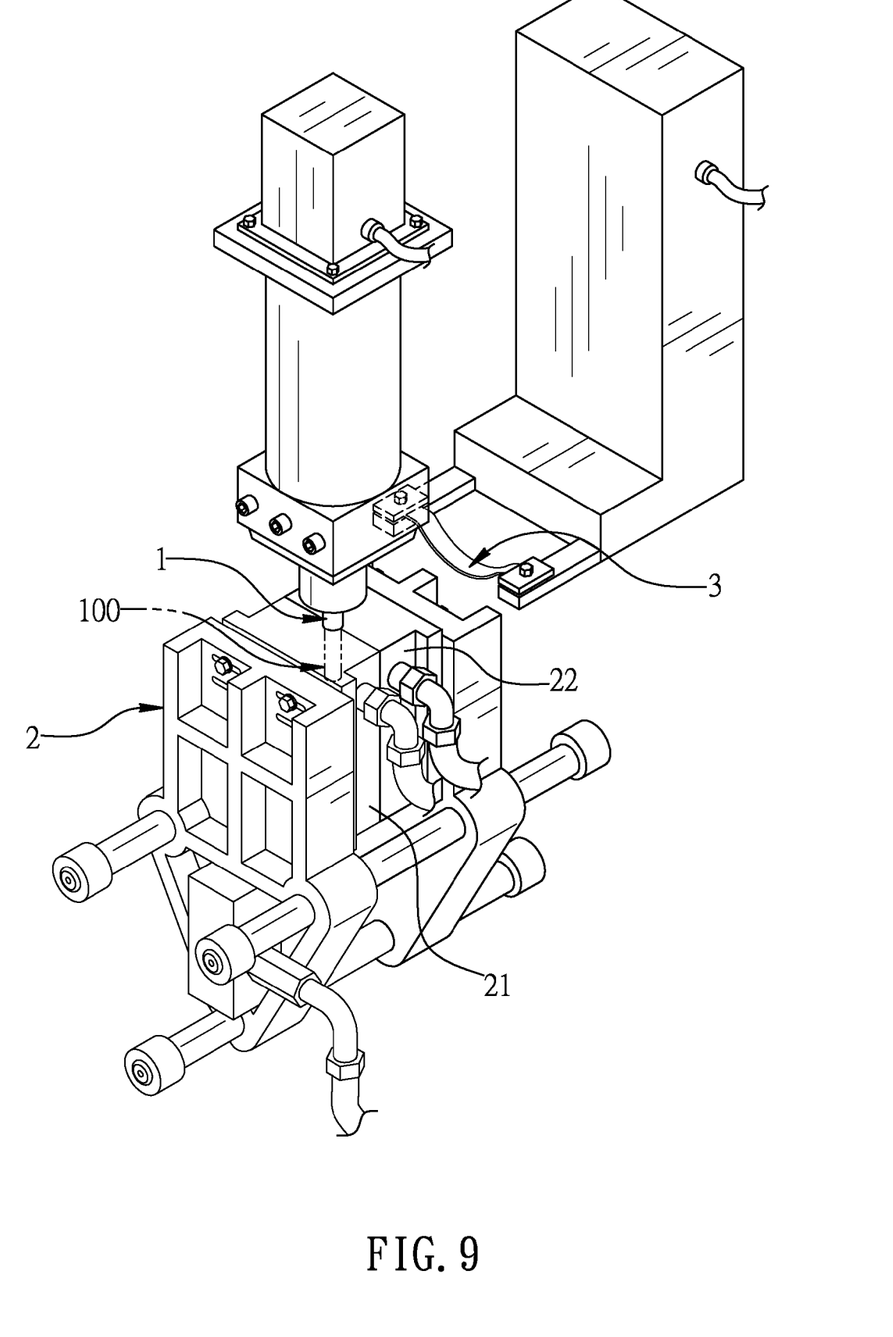
FIG. 9 is diagram of the method for manufacturing a handheld priming pump according to this present invention while the plastic resin is injected into the mold by an injector.
Figure 10:
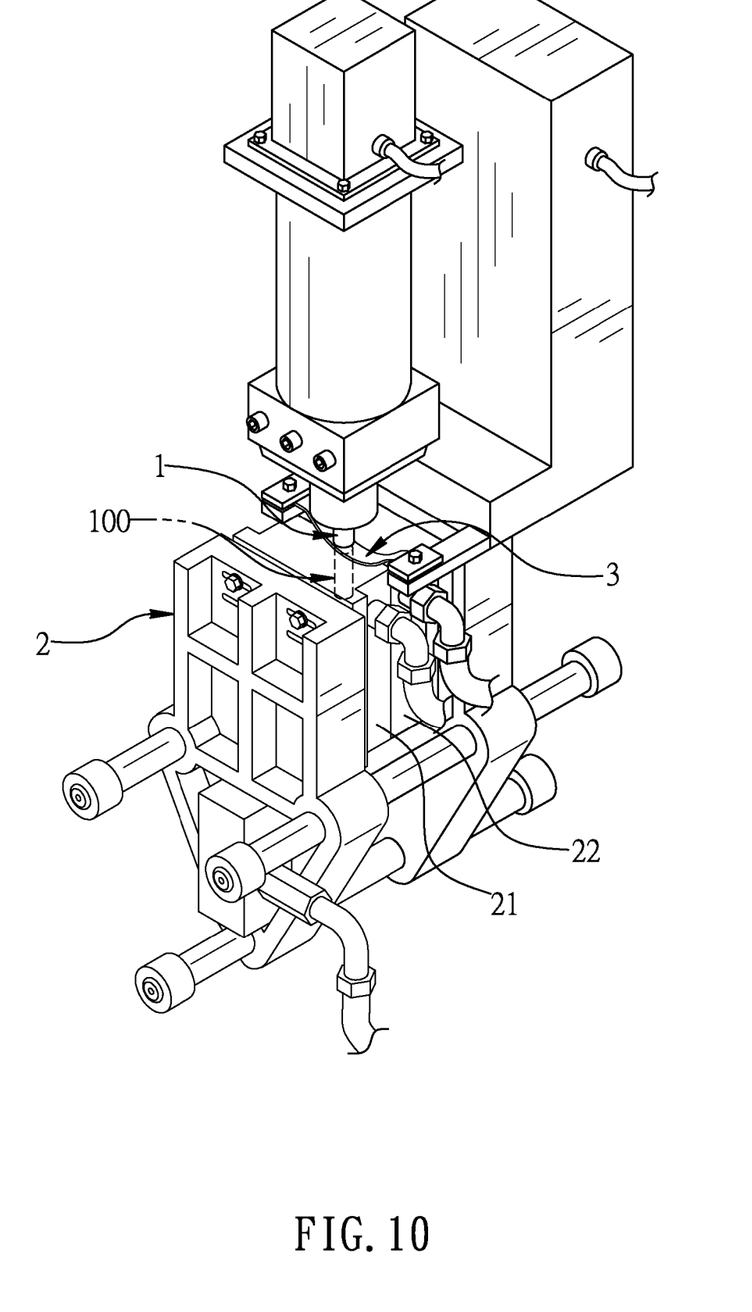
FIG. 10 is a diagram of the method for manufacturing a handheld priming pump according to this present invention while a blade cutting a residue of the plastic resin away after the plastic resin is injected into the mold by an injector.
Figure 11:
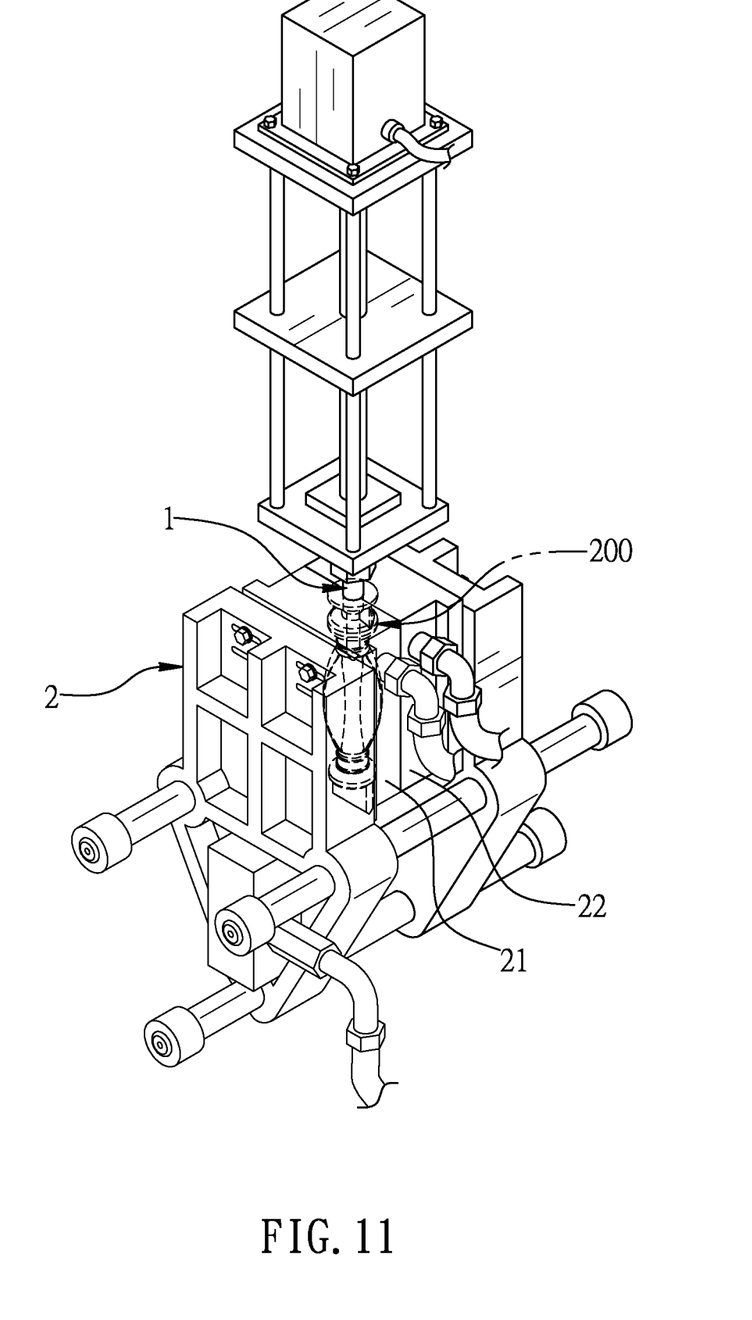
FIG. 11 is a diagram of the method for manufacturing a handheld priming pump according to this present invention while the nozzle is blowing in the chamber of the mold.
Figure 12:
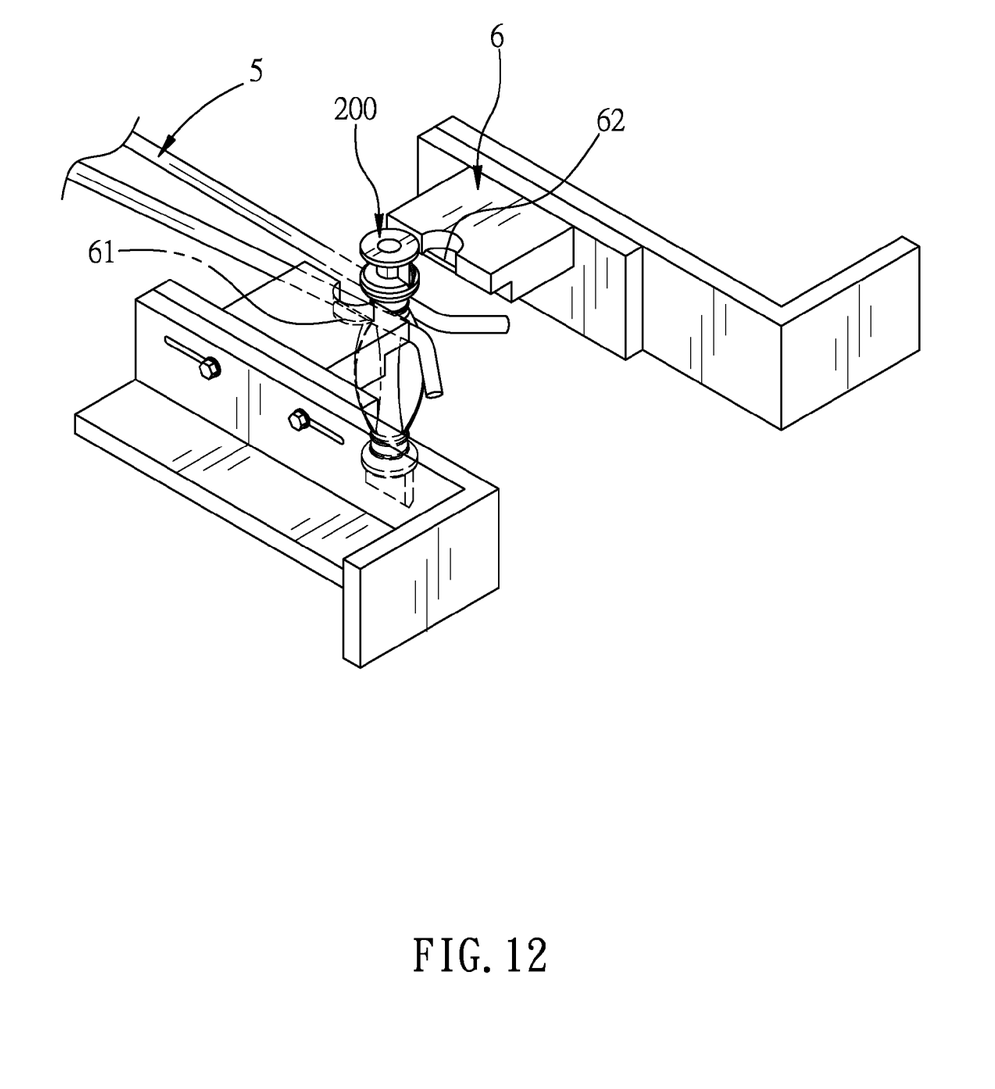
FIG. 12 is a diagram of the method for manufacturing a handheld priming pump according to this present invention while the first priming bump semi-finished product is disposed on a rail.
Figure 13:
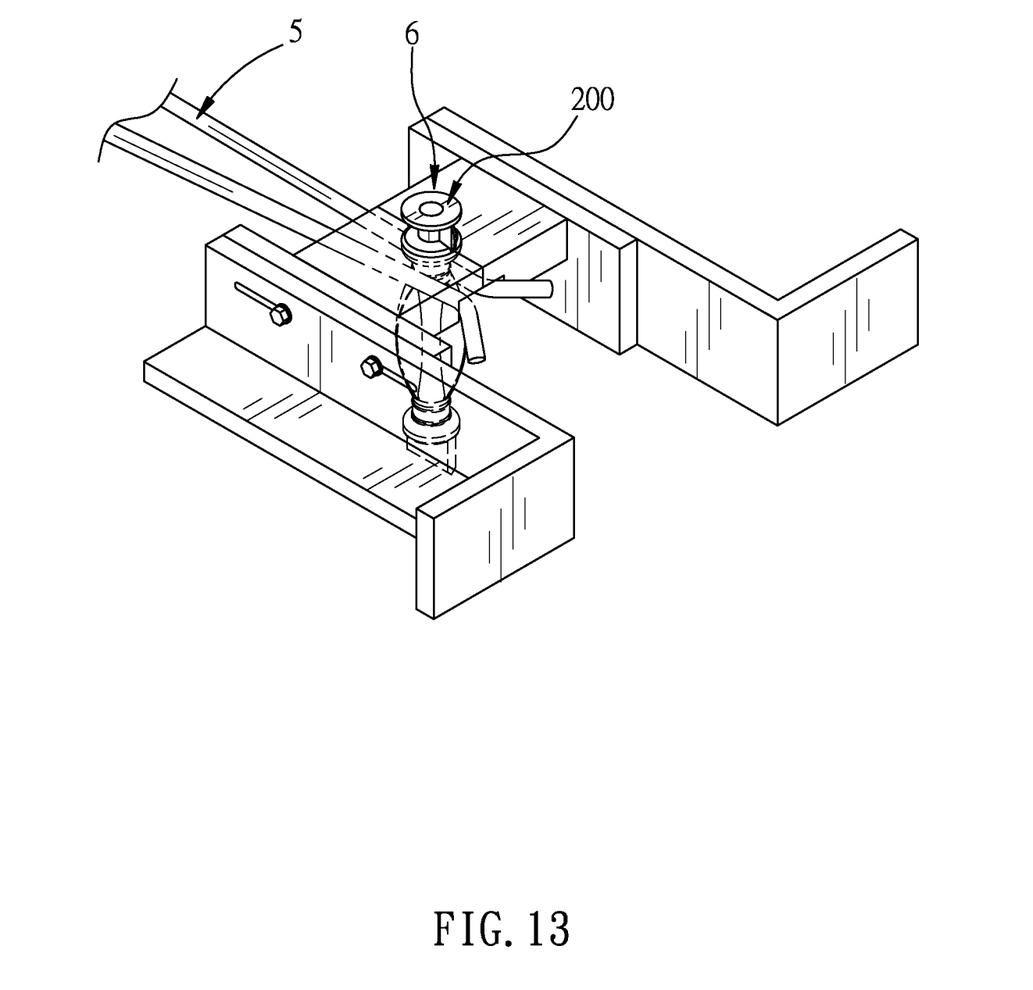
FIG. 13 is a diagram of the method for manufacturing a handheld priming pump according to this present invention while an upper portion of the first priming pump semi-finished product disposed on the rail is cut by a first knife and a second knife.
Figure 14:
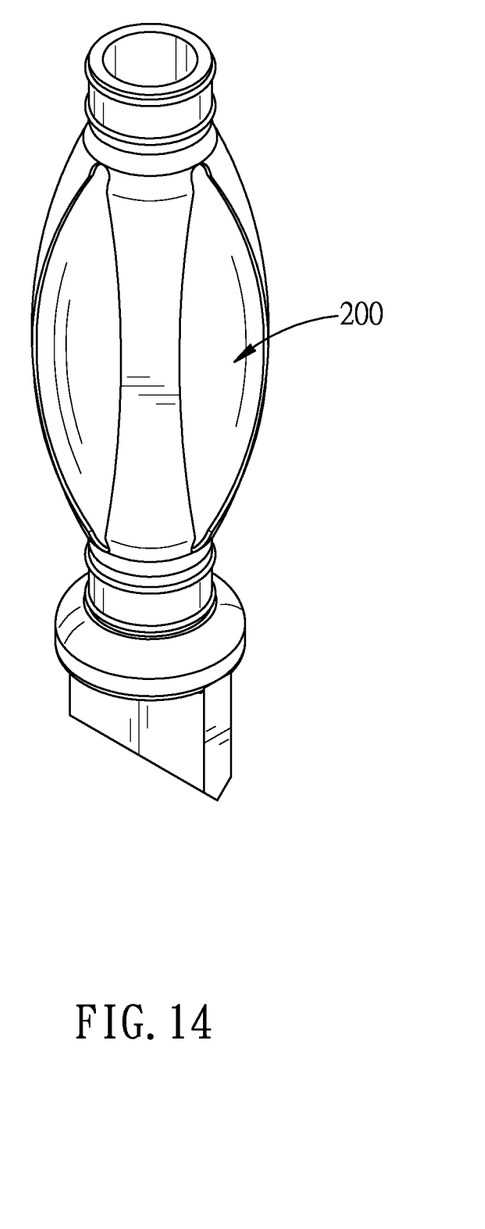
FIG. 14 is a diagram of the method for manufacturing a handheld priming pump according to this present invention while forming a second priming pump semi-finished product.

Please refer to FIGS. 1 to 16, the steps of the method for manufacturing a handheld priming pump according to this present invention comprise:

step S1: injecting a plastic resin 100 into a mold 2 by an injector 1, the mold 2 may include a first half mold 21 and a second half mold 22 which are combined with each other, and a chamber 23 having a priming pump shape is defined in the mold 2 when the first half mold 21 and second half mold 22 are closed;

step S2: returning the injector 1 to a standby position while the chamber 23 is injected full of the plastic resin 100, and a residue of the plastic resin 100 is cut away the injector 1 by a blade 3 disposed adjacent to the injector 1 (shown as in FIG. 10);

step S3: shifting the mold 2 under a nozzle 4 spaced from the injector 1;

step S4: moving the nozzle 4 to a top of the chamber 23 of the mold 2 and blowing such that the plastic resin 100 in the chamber 23 may be then formed a first priming pump semi-finished product 200;

step S5: returning the nozzle 4 to an original position, and shifting the mold 2 to a rail 5 after cooling the mold 2, the rail 5 is spaced from the nozzle 4 and disposed at the side opposite to the nozzle 4;

step S6: opening the mold 2 after the mold 2 moving to the rail 5 such that the first half mold 21 and the second half mold 22 are separated each other and then continue shifting to the rail 5 until an upper portion of the first priming pump semi-finished product 200 is clipped by the rail 5;

step S7: combining with the first half mold 21 and the second half mold 22 and at the same time driving a first knife 61 and second knife 62 to cut the upper portion of the first priming pump semi-finished product 200 to form a second priming pump semi-finished product 300; and step S8: dropping the second priming pump semi-finished product 300 into a box 7 to collect after the upper portion of the first priming pump semi-finished product 300 is cut.

Figure 15:
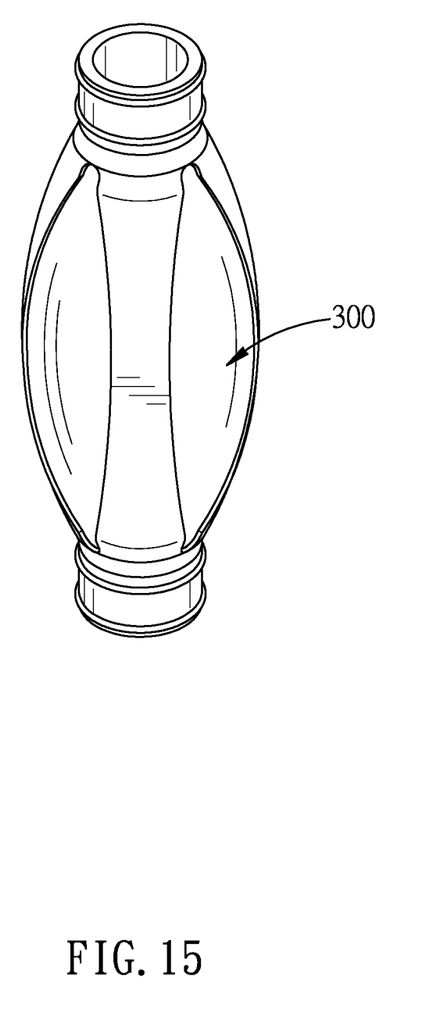
FIG. 15 is a diagram of the method for manufacturing a handheld priming pump according to this present invention while forming a priming pump finished product.
Figure 16:
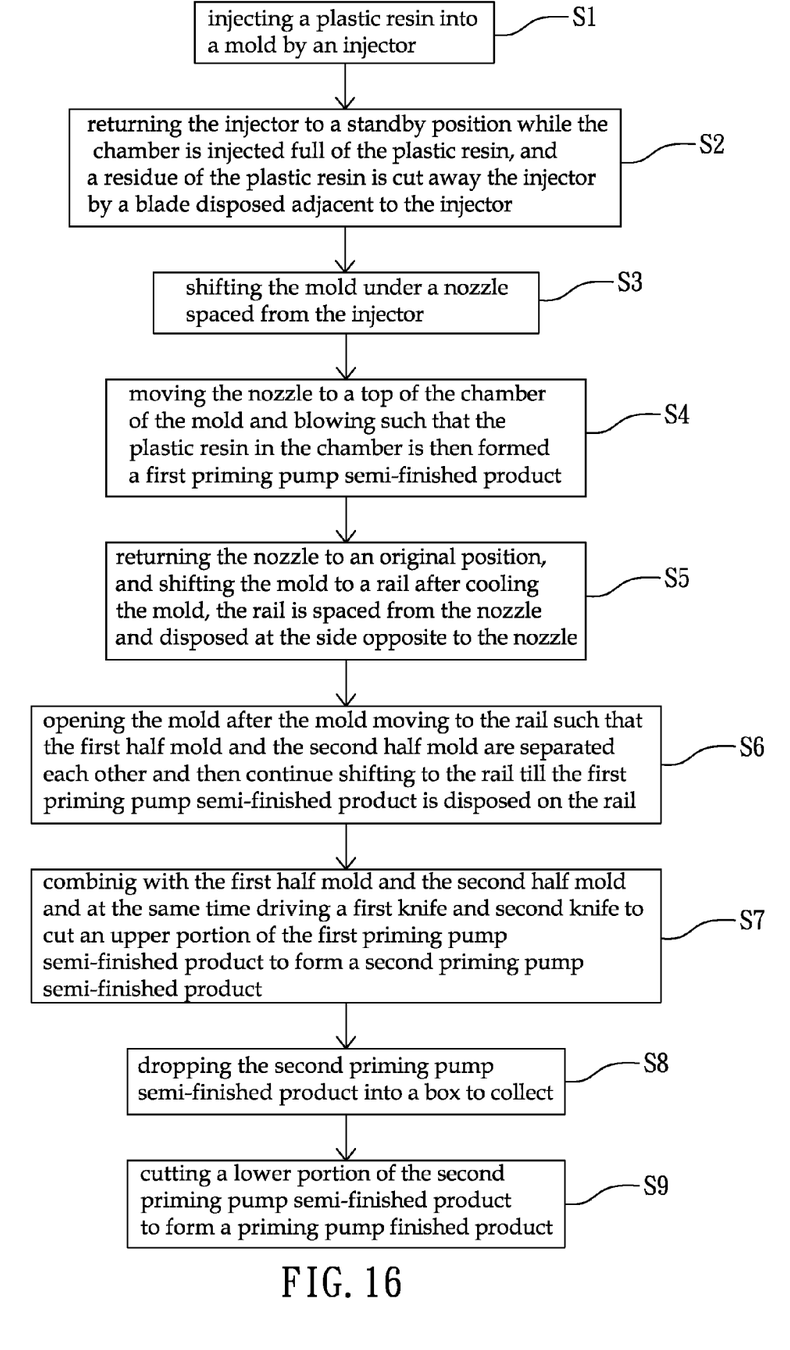
FIG. 16 is a flow chart of the method for manufacturing a handheld priming pump according to this present invention.

The above mentioned method may further comprise a step S9, which is cutting a lower portion of the second priming pump semi-finished product 300 to form a priming pump finished product 400.

The mold 2, the first knife 61, the second knife 62, the nozzle 4, the rail 5, and the box 7 may be a forming module 500. There may be two forming modules 500 respectively arranged at two sides of the injector 1 and move synchronously.

Therefore, it is capable of being automatic production and increase production yield after being modularized. The production time may be shortened and the defect rate may be also reduced.

What is claimed is:

1. A method for manufacturing a handheld priming pump, the steps comprising:

step S1: injecting a plastic resin into a mold by an injector, the mold includes a first half mold and a second half mold which are combined with each other, and a chamber is defined in the mold when the first half mold and second half mold are closed;

step S2: returning the injector to a standby position while the chamber is injected full of the plastic resin, and a residue of the plastic resin is cut away the injector by a blade disposed adjacent to the injector;

step S3: shifting the mold under a nozzle spaced from the injector;

step S4: moving the nozzle to a top of the chamber of the mold and blowing such that the plastic resin in the chamber is then formed a first priming pump semi-finished product;

step S5: returning the nozzle to an original position, and shifting the mold to a rail after cooling the mold, the rail is spaced from the nozzle and disposed at one side opposite to the nozzle;

step S6: opening the mold after the mold moving to the rail such that the first half mold and the second half mold are separated each other and then continue shifting to the rail until an upper portion of the first priming pump semi-finished product is clipped by the rail;

step S7: combining with the first half mold and the second half mold and at the same time driving a first knife and second knife to cut the upper portion of the first priming pump semi-finished product to form a second priming pump semi-finished product; and step S8: dropping the second priming pump semi-finished product into a box to collect after the upper portion of the first priming pump semi-finished product is cut.

2. The method as claimed in claim 1, further comprising a step S9, which is cutting a lower portion of the second priming pump semi-finished product to form a priming pump finished product.

3. The method as claimed in claim 1, wherein the mold, the first knife, the second knife, the nozzle, the rail, and the box are a forming module, there are two forming modules respectively arranged at two sides of the injector and move synchronously.

* * * * *